United States Patent [19]

Hill et al.

[11] 4,011,055

[45] Mar. 8, 1977

[54] ANTI-OXIDATION COATINGS

[75] Inventors: James Hill, Pamber Heath; Leslie Boyne, Newbury, both of England

[73] Assignee: The Secretary of State for Defence in Her Britannic Majesty's Government of the United Kingdom of Great Britain and Northern Ireland, London, England

[22] Filed: Sept. 8, 1975

[21] Appl. No.: 611,246

[30] Foreign Application Priority Data

Sept. 9, 1974  United Kingdom ............. 39333/74

[52] U.S. Cl. .............................. 29/195; 188/251 A
[51] Int. Cl.² ....................................... B32B 15/04
[58] Field of Search .............. 29/195 C; 188/251 A, 188/251 M, 73.2

[56] References Cited

UNITED STATES PATENTS 3,692,150  9/1972  Ruppe ........................... 188/251 A
3,892,293  7/1975  Dowell ........................... 188/251 A

FOREIGN PATENTS OR APPLICATIONS 1,311,537  3/1973  United Kingdom

*Primary Examiner*—L. Dewayne Rutledge
*Assistant Examiner*—E. L. Weise
*Attorney, Agent, or Firm*—Cameron, Kerkam, Sutton, Stowell & Stowell

[57] ABSTRACT

An anti-oxidation coating, particularly for the exposed peripheral regions of graphite brake discs for aircraft, comprises a layer of silicon on the surface of the graphite, a layer of nickel overlying the silicon layer and a layer of chromium overlying the nickel layer. The silicon layer is suitably formed by flame-spraying followed by arc-melting, and the nickel and chromium layers by electroplating.

7 Claims, 3 Drawing Figures

ANTI-OXIDATION COATINGS

BACKGROUND OF THE INVENTION

This invention relates to carbon artefacts having anti-oxidation coatings over at least part of their surfaces and has one application in carbon brake discs such as are used in aircraft disc-brake assemblies. "Carbon" in this Specification includes graphite.

An aircraft disc-brake assembly may, for example, comprise a plurality of rotor discs keyed at their outer edges to the wheel hub, and a plurality of stator discs keyed at their inner edges to a non-rotating torque tube, the two sets of discs being interleaved. To operate the brake, axial pressure is applied to the stack of interleaved plates, braking being obtained by the rubbing friction between the adjacent flat surfaces of the rotor and stator discs. Such an assembly is described, for example, in "Aircraft Engineering", vol 43, pp 12–14 (June 1971). The discs may be made of steel, but the alternative use of carbon-carbon composite discs has known advantages. For example such discs are lighter than steel discs and are less liable to seize-up from overheating, eg in an emergency stop.

With carbon discs, however, the high temperatures attained during braking tend to cause oxidation of those areas of the disc surface exposed to the atmosphere, in particular the inner and outer peripheral regions; the rubbing surfaces themselves are mutually shielded from the atmosphere when in contact. Such oxidation is, of course, undesirable.

It has already been proposed to apply protective coatings to such areas to prevent or reduce oxidation. For example UK Patent Specification No. 1,311,537 discloses coatings of several alternative substances, including inter alia silicon, nickel and chromium, and German Offenlegungsschrift 2,306,631 (UK Patent Specification No. 1,415,853) describes the use of a mixture of boron-containing and carbonisable organic materials.

The present invention provides a protective coating comprising a combination of superimposed layers of specified substances which has been found particularly effective.

SUMMARY OF THE INVENTION

According to the present invention a carbon artefact, particularly but not exclusively a carbon brake disc, includes an anti-oxidation coating over at least part of its surface, said coating comprising:
 a layer of silicon on the surface of the artefact;
 a layer of nickel overlying the silicon layer;
 and a layer of chromium overlying the nickel layer.

The silicon layer may be deposited by flame-spraying silicon powder on to the surface, the deposit being subsequently arc-melted to produce a glassy layer. The nickel and chromium layers may be deposited by electroplating or electroless plating. In order to provide a suitable keying surface on the silicon, and to increase its electrical conductivity for electroplating the nickel layer, a thin layer of silver may be deposited on the silicon layer by electroless plating; the provision of such a silver layer prior to nickel plating is well known in the electroplating art.

The thickness of the layers is not critical. The silicon layer suitably has a thickness in the range 0.002–0.010 inch, preferably about 0.005 inch. The silver layer may be in the range $10^{-6} - 10^{-4}$ inch, suitably about $10^{-5}$ inch. The nickel and chromium layers may each be in the range 0.0005 – 0.005 inch, a preferred thickness being about 0.002 inch.

DESCRIPTION OF THE DRAWINGS

To enable the nature of the present invention to be more readily understood, attention is directed by way of example to the accompanying drawings wherein.

DESCRIPTION OF PREFERRED EMBODIMENT

Figure 1:
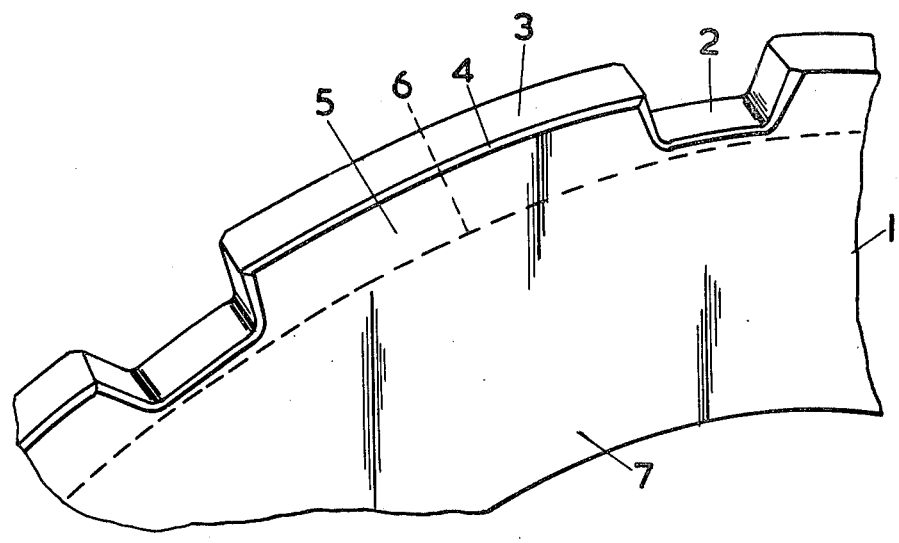
FIG. 1 is a perspective view of part of a carbon-carbon composite brake disc showing the outer periphery.

In FIG. 1 the disc 1 is a graphitised carbon-carbon composite rotor disc and is provided with keyways 2 by which it is keyed to the wheel hub in the brake assembly. The edge 3 of the disc is bevelled at 4. The surface areas exposed in use to atmospheric oxidation are the edge surfaces 3 and 4, and the flat surfaces 5 (on both sides of the disc) extending inwards to the line 6, which indicates the limit of the area 7 rubbed by the adjacent stator disc (not shown). The keyways of the stator discs are of similar form but located at their inner peripheries, where corresponding areas are similarly exposed and require protection. The inner periphery of disc 1, and the outer periphery of the stator discs are circular in plan, with bevelled edges similar to 4. These surfaces also require protection.

The above-described surfaces are provided with an anti-oxidation coating produced by the following sequence of operations.

1. Flame-spraying silicon powder on to the surfaces in an argon atmosphere. Six coats are applied, giving a final thickness of about 0.005 inch. After each flame-spraying operation, the applied layer is arc-melted in argon, using an argon-arc welding torch, to produce a a regular, even glassy surface. This treatment also causes the silicon to diffuse into the graphite, thereby improving adhesion. The flame spraying and arc-melting torches may be so located, eg diametrically opposite one another, that both these operations are performed simultaneously as the disc is rotated.

2. Depositing silver on the silicon by electroless plating to a thickness of $10^{-5}$ inch.

3. Depositing nickel on the silver by electroplating to a thickness of 0.002 inch.

4. Depositing chromium on the nickel by electroplating to a thickness of 0.002 inch.

During electro-deposition, the rubbing surfaces of the disc are protected in a known manner. After electroplating, the discs are heated in vacuum to about 150° C for 48 hours to remove traces of the electrolyte. Conventional plating baths are used.

Figure 2:
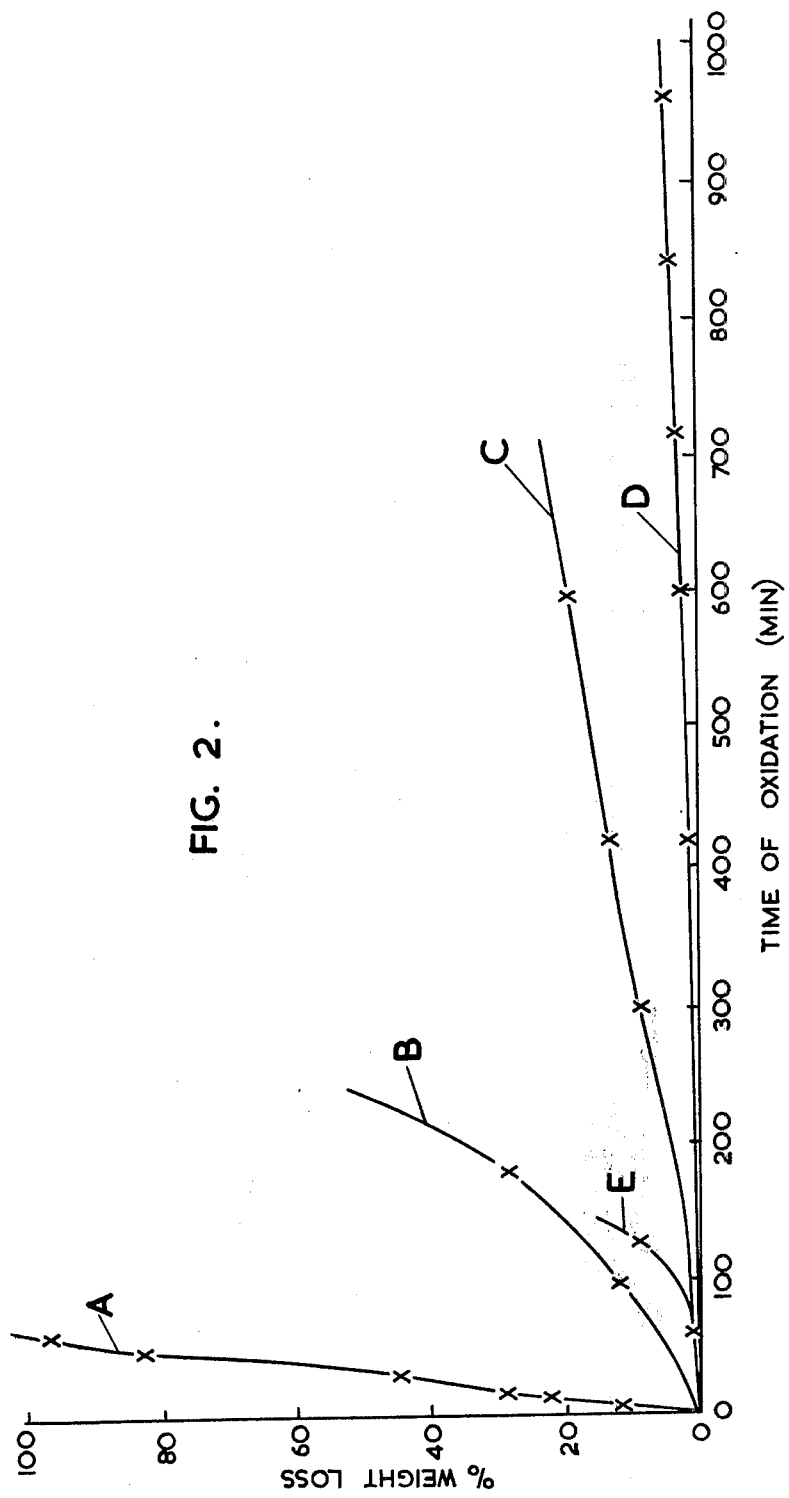
FIG. 2 shows graphs of percentage weight loss plotted against time of oxidation for uncoated and coated carbon.

FIG. 2 shows the results of oxidation-resistance tests performed on 1 cm graphite cubes with different applied coatings. The tests were performed at 1000° C in an air-flow of 5 cm/sec. Percentage weight loss is plotted against time of oxidation.

In FIG. 2:

Curve A is for unprotected graphite.

Curve B is for graphite electroplated with 0.002 inch nickel, preceded by a thin (about $10^{-5}$ inch) electroless silver layer.

Curve C is for graphite treated as for B, but with 0.001 inch chromium electroplated over the nickel.

Curve D is similar to curve C but with the chromium layer increased to 0.002 inch.

Curve E is for graphite coated with a boron/phenolic-resin material the type disclosed in Offenlegungsschrift 2,306,631.

FIG. 2 shows the superiority of the chromium/nickel combination (Curves C and D) over nickel along (Curve B). Curve E shows good protection, but of limited duration.

Figure 3:
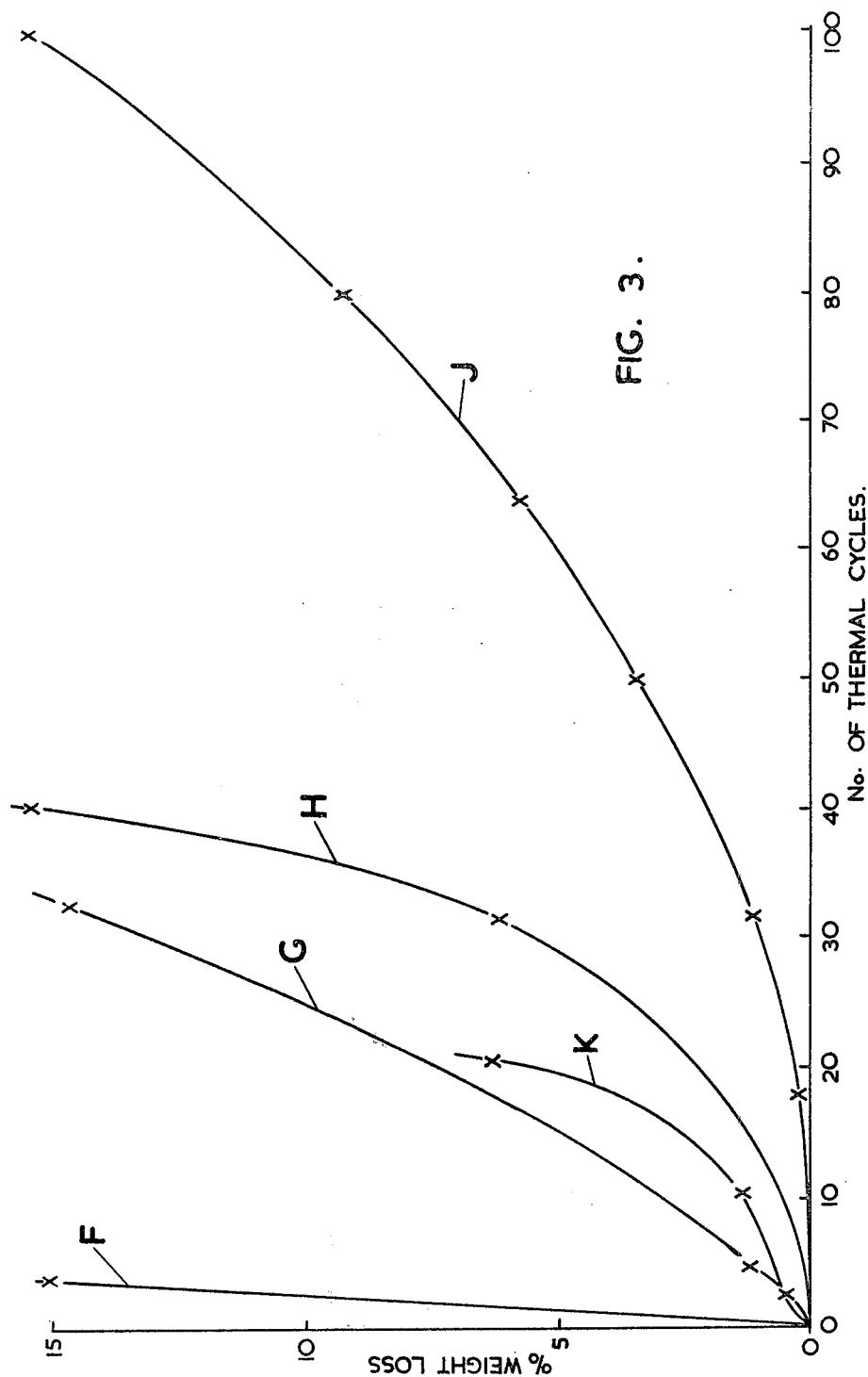
FIG. 3 shows graphs of percentage weight loss plotted against number of thermal test cycles for uncoated and coated carbon.

In FIG. 2 there is no silicon layer. FIG. 3 shows the improvement effected by its introduction. Unlike the isothermal tests of FIG. 2, the results in FIG. 3 were obtained by subjecting the cubes to continuous repetition of the following 8 min thermal cycle:

1. Heat-up for 3 mins, to appox 1000° C; air static.
2. Hold at temperature for 2 minutes; oxidising air velocity 30 cm/sec.
3. Cool cube outside furnace for 3 minutes; ambient air at about 5 psi through 0.25 diameter tube blown over cube.
4. Return to furnace and repeat (1).

This cycle approximates more closely to operating conditions in a brake assembly. FIG. 3 plots percentage weight loss against number of cycles.

In FIG. 3:

Curve F is for unprotected graphite.

Curve G is for 0.005 inch flame-sprayed, arc-melted, silicon.

Curve H is for 0.002 inch electroplated nickel (preceded by about $10^{-5}$ inch electroless silver) followed by 0.002 inch electroplated chromium, ie the same combination as curve D in FIG. 2.

Curve J is for the 0.002 inch nickel/0.002 inch chromium combination of curve H, superimposed on the 0.005 inch silicon layer of curve G. Curve J is thus the result with a coating embodying the present invention.

Curve K is for the boron/phenolic-resin material of curve E in FIG. 2.

It will be observed that the coating of curve J increased the number of thermal cycles required to give a weight loss of 15% by a factor of approximately 2.5 as compared with a nickel/chromium coating alone (curve H), and by a factor of approximately 3.0 as compared with silicon alone (Curve G). Or, to express the improvement in another way, the number of cycles (100) required to give a weight loss of 15% with the present coating exceeded the sum of the number required with the coatings giving curves G and H (33+40 = 73) by about 30%, ie the whole is greater than the sum of the parts.

We claim:

1. A carbon artefact including an anti-oxidation coating over at least part of its surface, said coating comprising:
   a layer of silicon on the surface of the artefact;
   a layer of nickel overlying the silicon layer;
   and a layer of chromium overlying the nickel layer.

2. A carbon artefact as claimed in claim 1 wherein the silicon layer is deposited by flame-spraying silicon powder followed by arc-melting thereof.

3. A carbon artefact as claimed in claim 2 wherein the nickel and chromium layers are deposited by electroplating.

4. A carbon artefact as claimed in claim 3 wherein the nickel layer is preceded by a silver layer deposited on the silicon layer by electroless plating.

5. A carbon artefact as claimed in claim 3 wherein the silicon layer has a thickness in the range 0.002–0.010 inch, and the nickel and chromium layers each have a thickness in the range 0.0005 – 0.005 inch.

6. A carbon artefact as claimed in claim 5 wherein the silicon layer is approximately 0.005 inch thick and the nickel and chromium layers are each approximately 0.002 inch thick.

7. A carbon artefact as claimed in claim 1 wherein said artefact is a carbon brake disc having peripheral parts of its surface provided with said coating.

* * * * *